United States Patent [19]
Westaway et al.

[11] Patent Number: 5,226,176
[45] Date of Patent: Jul. 6, 1993

[54] SYSTEM FOR SELECTIVELY ABORTING OPERATION OR WAITING TO LOAD REQUIRED DATA BASED UPON USER RESPONSE TO NON-AVAZLABILITY OF NETWORK LOAD DEVICE

[75] Inventors: William D. Westaway, Andover, Mass.; David P. Roberts, Santa Fe, N. Mex.; Thomas R. Caron, Chelsea, Mass.

[73] Assignee: Microsystems, Inc., Mountain View, Calif.

[21] Appl. No.: 570,293

[22] Filed: Aug. 20, 1990

[51] Int. Cl.$^5$ ............................................. G06F 13/00
[52] U.S. Cl. ............................ 395/800; 364/DIG. 1; 364/236.2; 364/260; 364/940.62; 395/325
[58] Field of Search ............... 395/200, 325, 375, 800, 395/600

[56] References Cited

U.S. PATENT DOCUMENTS

| | | | |
|---|---|---|---|
| 4,769,771 | 9/1988 | Lippmann et al. | 395/200 |
| 4,780,821 | 10/1988 | Crossley | 364/200 |
| 4,851,988 | 7/1989 | Trottier et al. | 395/200 |
| 4,941,084 | 7/1990 | Terada et al. | 395/650 |
| 5,012,405 | 4/1991 | Nishikado et al. | 395/600 |
| 5,109,486 | 4/1992 | Seymour | 395/200 |
| 5,146,561 | 9/1992 | Carey et al. | 395/200 |
| 5,146,568 | 9/1992 | Flaherty et al. | 395/325 |

*Primary Examiner*—Thomas C. Lee
*Assistant Examiner*—Mehmet Geckil
*Attorney, Agent, or Firm*—Blakely Sokoloff Taylor & Zafman

[57] ABSTRACT

Apparatus and methods are disclosed having application for use in data processing systems which include a plurality of data processing devices ("agents") coupled to a communication network and at least one system software resource. The system software resource may comprise a floppy disk drive, hard disk drive, magnetic tape, optical storage device or other data storage device. All programs, data and the like accessible to the system software resource are indexed and "clustered", such that the data/programs are grouped as they relate to one another to assure full functionality of the software being loaded. In the event that the desired program/data to be accessed by an agent is not stored in the system software resource, the method of the present invention includes the steps of suspending any further data processing operations by the agent. The system software resource, by scanning through the index of all available data/programs accessible to the system software resource. In the event that the desired program/data is accessible to the system software resource, the desired data/programs are loaded into the system software resource and data processing operations are then resumed by the agent requiring the data/programs. If the desired data/programs are not available to the system software resource, then the current data processing operations are terminated.

4 Claims, 4 Drawing Sheets

SYSTEM FOR SELECTIVELY ABORTING OPERATION OR WAITING TO LOAD REQUIRED DATA BASED UPON USER RESPONSE TO NON-AVAZLABILITY OF NETWORK LOAD DEVICE

BACKGROUND OF THE INVENTION

1. Field of the Invention

The present invention relates to apparatus and methods for providing data and programs to a data processing device, and more particularly, to methods and apparatus for automatically loading missing system software without terminating current processing operations being executed by the data processing device in a data processing system.

2. Art Background

In many data processing systems it is common for a plurality of data processing devices ("agents") to be coupled to a network. System software resources, such as for example, disk drives, tape drives, or optical storage devices such as CD ROMs, may be coupled to the network to provide system software to be accessed and executed by agents coupled to the network. In the event an agent requires certain software for execution, and the software is not available on the agent's local hard disk drive or internal memory, then it accessed from one of the system software resources such as a disk drive, tape drive or the like.

Due to increasing software functionality and the use of high level compilers, software storage requirements have historically increased at a rate which exceeds available on-line storage capabilities. In addition, in an effort to reduce the cost of agents, such as engineering workstations, it is not always possible to keep increasing hard disk drive storage capacity and meet cost reduction requirements, while still fitting all of the required software comprising a part of an operating environment on the system software resource devices. Accordingly, it is common that only a part of the available software and data processing is loaded into the system's software resources. This means that much of the software which comprises the operating system environment and application programs remains unloaded, and therefore not readily accessible, to agents coupled to the data processing system.

Typically, in most software operating environments, a user obtains a message similar to "file not found" or "command not found", when an attempt occurs to access programs which have not yet been loaded onto the system's software resources, In most situations, this prematurely terminates whatever process, programs, or command is being executed. This may be expensive if the process which terminates prematurely has been in progress for a long period of time.

Today, there exists many "indexes" which allow the user to find and load missing software, and tool/utilities which will load the missing programs for the user. However, these indexes do not help the user in cases in which a running process attempts to access software which is missing. Only after the process currently being executed has terminated, can these index tools be used to load the software necessary for the access at some future time in a future process. Therefore, if a running process attempts to access missing software, the operating system typically returns a "file not found" message, and generates a fatal error returned to the running process, instead of finding and loading the required programs without causing a termination of the executing process.

As will be described, the present invention provides apparatus and methods wherein all needed and available software is indexed, such that when encountering missing software during the execution of a process, the currently executing process is suspended, and upon the user's command, the required software and other data is loaded into a system software resource and execution of the suspended processes is resumed. In this way, a user does not lose valuable computer time if he/she did not have the foresight to preload the required software, programs or other data.

SUMMARY OF THE INVENTION

Apparatus and methods are disclosed having application for use in data processing systems which include a plurality of data processing devices ("agents") coupled to a communication network and at least one system software resource. The system software resource may comprise a floppy disk drive, hard disk drive, magnetic tape, optical storage device or other data storage device. All programs, data and the like accessible to the system software resource are indexed and "clustered", such that the data/programs are grouped as they relate to one another to assure full functionality of the software being loaded. In the event that the desired program/data to be accessed by an agent is not stored in the system software resource, the method of the present invention includes the steps of suspending any further data processing operations by the agent. The system software resource determines if the desired data is available to the system software resource, by scanning through the index of all available data/programs accessible to the system software resource. In the event that the desired program/data is accessible to the system software resource, the desired data/programs are loaded into the system software resource and data processing operations are then resumed by the agent requiring the data/programs. If the desired data/programs are not available to the system software resource, then the current data processing operations are terminated.

NOTATION AND NOMENCLATURE

The detailed descriptions which follow are presented largely in terms of algorithms and symbolic representations of operations of data bits within a computer memory, or operations of a data processing system. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, through not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention. In the present case, the operations are machine operations. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. In addition, the present invention is not described with reference to any particular programming language. It will be appreciated that a variety of programming languages may be used to implement the teachings of the invention as described herein.

DETAILED DESCRIPTION OF THE INVENTION

In the following description, apparatus and methods are described for providing desired programs/data to a data processing device disposed in a data processing system. In the following description, numerous details are set forth such as computer and storage device operations such as loading, storing, etc. in order to provide a more thorough understanding of the present invention. However, it will be apparent to one skilled in the art that the present invention may be practiced without these specific details. In other instances, well known circuits and structures are not described in detail and are shown in block diagram form in order not to obscure the present invention unnecessarily.

Figure 1:
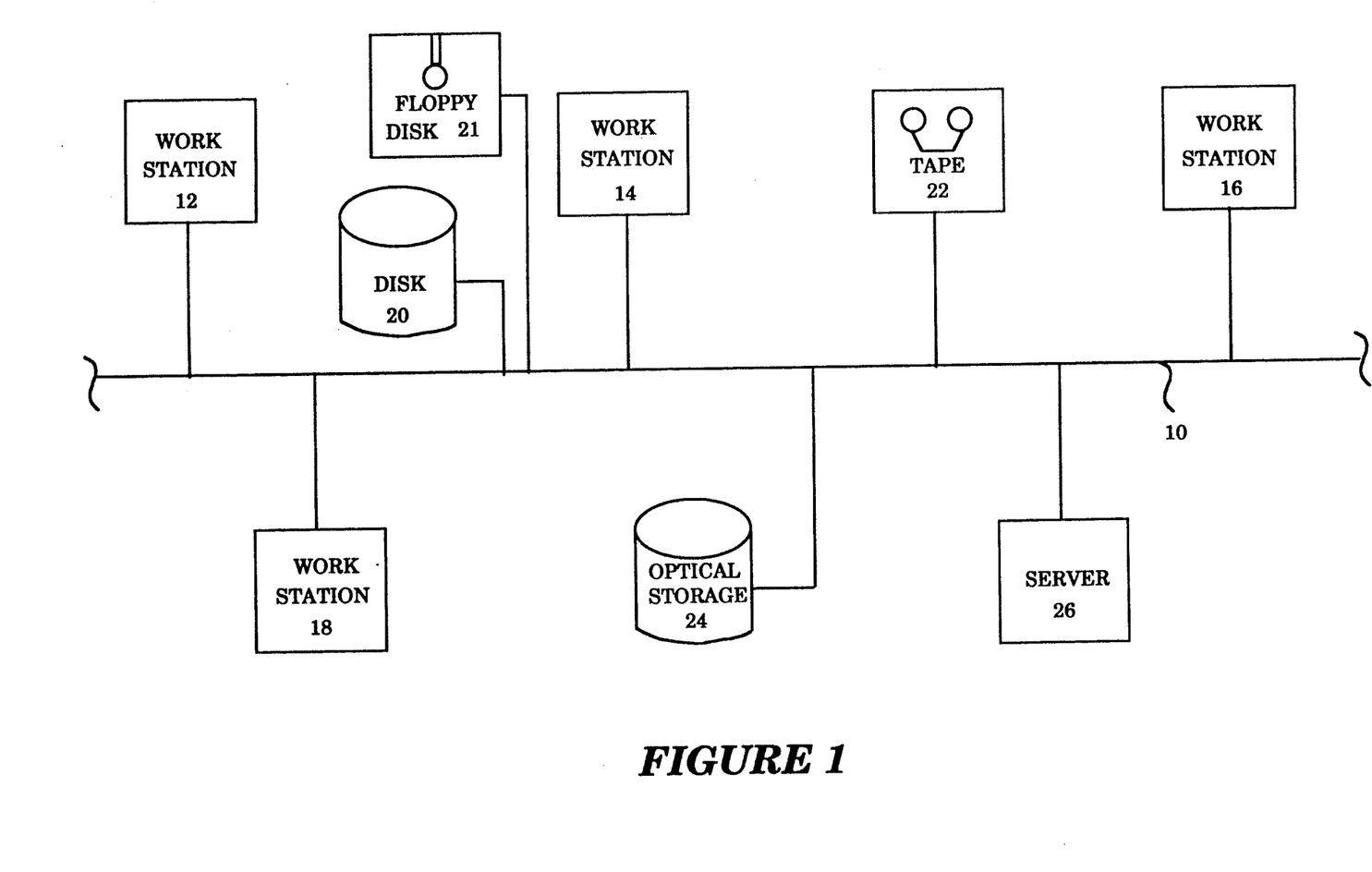
FIG. 1 illustrates a data processing system incorporating the teachings of the present invention.

Referring now to FIG. 1, a data processing system incorporating the teachings of the present invention is shown. As illustrated, the data processing system includes a local area network which comprises a cable 10 to which engineering workstations, 12, 14, 16 and 18 are coupled. Presently, engineering workstations comprise computers manufactured by the assignee of the subject application, Sun Microsystems, Inc. However, it will be appreciated by one skilled in the art that the workstation may comprise any data processing resource, computer or specialized data processing device. System software resources, such as for example, hard disk drive 20, floppy disk drive 21, tape drive 22 and optical storage device 24 are also coupled to the cable 10 and provide data and/or programs to the workstations, as needed during the execution of data processing operations by the individual workstations. The server 26 is also coupled to the cable 10 for providing other centralized data processing facilities and resources, as is well known.

As previously discussed, it is common for data processing systems, such as that illustrated in FIG. 1, to have insufficient data storage capacity in the hard disk drive, floppy disk drive, tape drive and/or optical storage device to provide immediate access to all data and/or programs required by the workstations 12, 14, 16 and 18. In accordance with the teachings of the present invention, all data and programs accessible to the system software resources, namely, disk 20, disk 21, tape drive 22 and optical storage 24 are indexed and stored either locally at each workstation, or alternatively, at the server 26. One example of a data record comprising the index is illustrated below. It will be appreciated, however, that the following is for illustration only, and that the present invention may be utilized using any other equivalent indexing technique.

| Field # | Element Name | Element description |
|---|---|---|
| 1 | key | direct access random key technique |
| 2 | filepath | full file pathname |
| 3 | filename | file being searched |
| 4 | clustername | name of the software "cluster" |
| 5 | required clusters | related software "clusters" which will also have to be loaded in order to assure that the newly loaded software will function |
| 6 | software load size | amount of space required by the software if it were loaded |
| 7 | software location | location on either the media or the network |

As will be appreciated from the above sample index data record, the data fields for the index identify the data or program which is accessible to the system software resource by "file name" and its "file path" (the file path guarantees that the file is uniquely identified). In addition, the data or programs are "clustered", such that if one block of programs or software within the cluster is loaded, any additional blocks or clusters of software required for full operation of the process being executed by the workstation is also loaded. As indicated, the index further identifies the software load size to ensure that there is sufficient storage space in the hard disk, tape drive or the like to load the needed programs and/or software.

Figure 2:
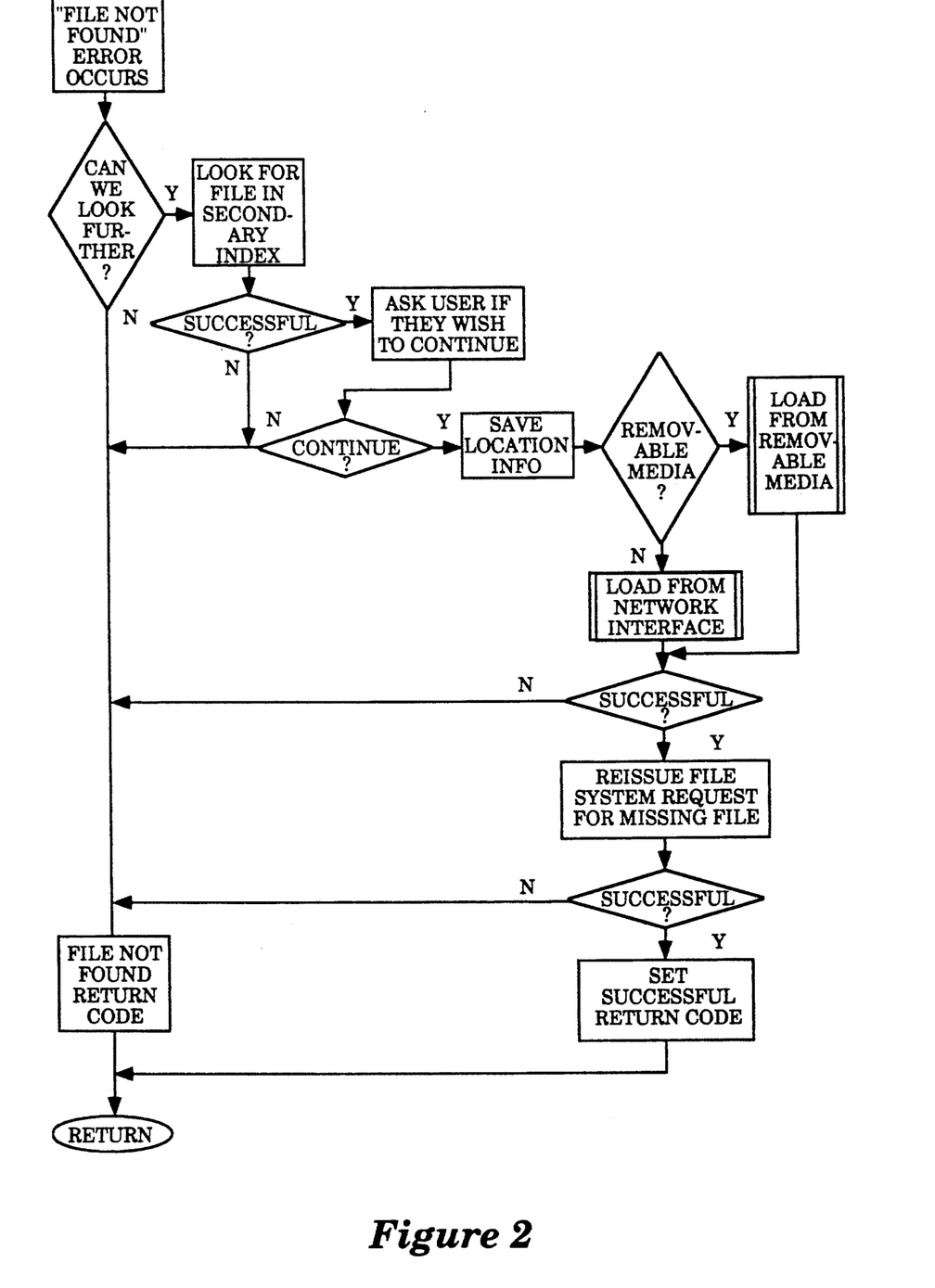
FIG. 2 is a flow chart illustrating the sequence of operations executed by the present invention in the event a "file/command not found" error occurs.

Referring now to FIG. 2, the overall sequence of operation of the present invention is illustrated. In the figure, the file system software of the operating system utilized by the data processing system in FIG. 1 detects any "file/command not found" error condition, such that this condition is intercepted and the current process being executed by, for example workstation 12, is suspended. In other words, in the event data and/or programs required for the continued operation and processing of the program being executed by workstation 12 is not available from the system software resources, such as hard disk 20, floppy disk 21, optical storage 24, or tape 22, then the data processing operation of workstation 12 is suspended. The workstation then determines if the data and/or programs required for the continued execution of the desired process is available by scanning through the index. If the missing data and/or programs are not found in the index, then a return occurs to the "fatal" error condition ("file/command not found return code"), and the process to be executed by the workstation is terminated. However, if the desired data/programs is found in the index (or set of indices), then the user is asked if it is desired to continue with the execution of the program by the workstation. If the user wishes to continue with the execution of the program, the requisite data/program is identified by software cluster and type and the desired data/program is then either loaded from a removeable media source (such as a floppy disk drive, tape or optical storage device), or loaded from a network interface. Once successfully acquired by the particular system software resource, the workstation reissues a "file system request" for the missing file, and if successfully accessed (which it should now be), a return code is sent to the workstation such that the desired data/program is provided and execution of the program may continue.

It will be noted that during the process of loading the removeable media (such as floppy disk 21 or tape 22) that the load device "state" must be saved to allow the removal of any media which might currently be in the load device. For example, the tape file number or diskette number must be stored as well as the record/sector numbers or any other physical attributes which are needed to relay or restore the devices' physical state once the missing software has been loaded.

Figure 4:
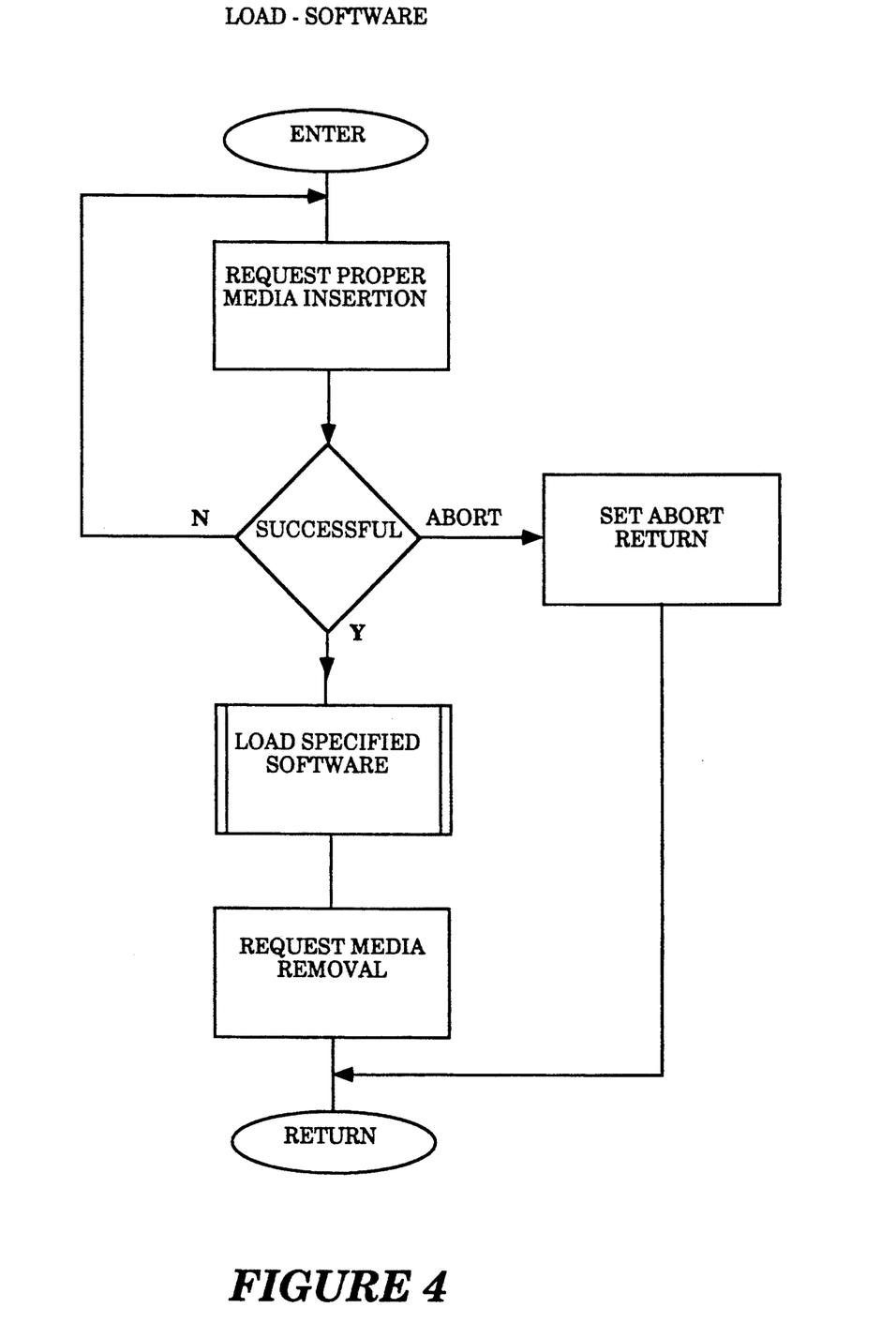
FIG. 4 is a flow chart illustrating the sequence of operations of the present invention for loading software into the system software resource.

Reference is made to FIG. 4 in which a request is made for proper media (e.g. a tape, disk or optical storage) to be inserted or loaded into the load device. If the load is successful, then the appropriate program/software are loaded into the system and accessed by the requesting workstation. Once the desired data/program is accessed by the workstation, a request is made by the user (or workstation) to request removal of the particular media and return the load device to its original state (i.e. reinsert any media which had to be removed in order to load the missing software).

Figure 3:
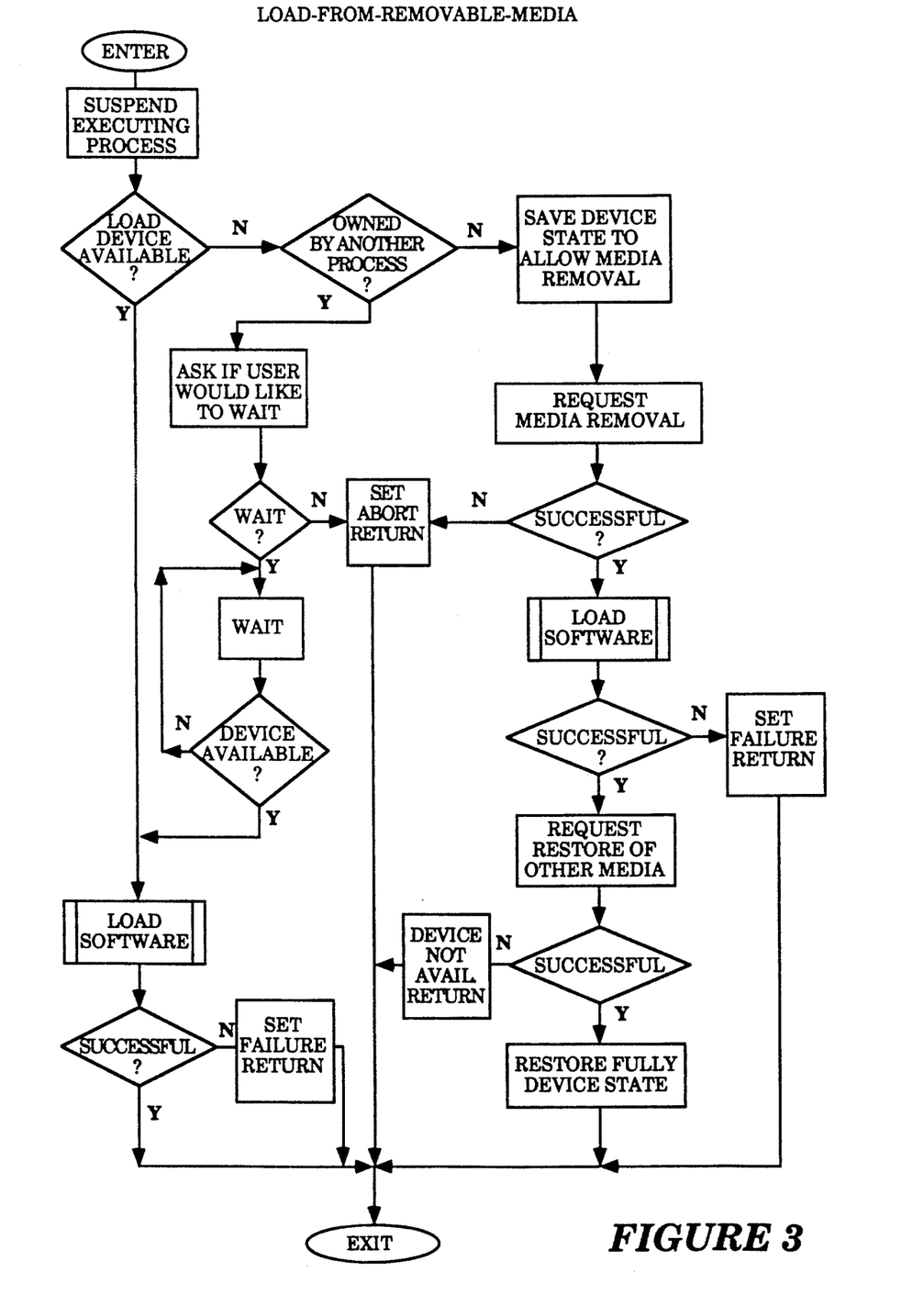
FIG. 3 is a flow chart illustrating the sequence of operations of the present invention.

Referring now to FIG. 3, an alternate embodiment of the present invention is illustrated in which the workstation (for example, workstation 16) obtains an operating system "missing file/command" indicating that needed data/programs are not stored in the system's software resources. In such event, execution of the process by the workstation is suspended and it is determined whether an appropriate load device (removeable device) is available. If the load device is available, then the software if available is loaded, and if the load is successful, then the workstation 16 accesses the necessary data/programs and continues execution of the process. This process is iterative and will be performed for each occurrence when the load device is not available. However, as shown in FIG. 3, in the event that the load device is not available, a determination is made as to whether or not the load device is currently "owned" by another process, meaning that the particular load device is currently busy. If another process is not using the particular load device (for example, tape drive 22), then the current state of the device is saved and the media (e.g. tape) is removed. The appropriate media storing the desired data/programs is loaded onto the load device comprising the system software resource, and the data/program is then accessed by the workstation. As shown in FIG. 3, the original media is then reloaded onto the load device and the load device state is fully restored.

As also shown in FIG. 3, in the event the load device is currently busy, a message appears asking the user (workstation 16) if he would like to wait for the load device to become available. If the response is negative, the process is aborted by the workstation. However, once the load device becomes available, as shown in the flow chart of FIG. 3, the software is loaded into the load device and accessed by the workstation, as previously described.

The present invention's unique apparatus and methods permit continued computer operations in a data processing system and expanded access to data and/or programs otherwise not available. While the present invention has been particularly described with reference to FIGS. 1 through 4, it should be understood that the figures are for illustration only and should not be taken as limitations upon the invention. For example, although the present invention has been described in conjunction with a network distributed computer processing system, the invention is also applicable in non-networked systems, as well as dedicated or hybrid data processing applications. It is further contemplated that many changes and modifications may be made, by one of ordinary skill in the art, without departing from the spirit and scope of the invention as disclosed above.

We claim:

1. In a data processing system including a plurality of data processing devices and a load device all coupled to a network, said system further including a system software resource for providing data to said plurality of data processing devices, an improved method for providing required system data to a first data processing device in the event said required system data is not stored in said system software resource, comprising the steps of:

generating an index data record of all data accessible to said system software resource;

said first data processing device accessing said system software resource via said network so as to determine that said required system data is not stored in said system software resource;

said first data processing temporarily suspending any further data processing operations;

said system software resource accessing said index data record so as to determine if said required system data is accessible to said system software resource;

said system software resource accessing said load device via said network so as to determine if said load device is available to load said required system data to said system software resource;

in the event said load device is owned by a second data processing device from said plurality of data processing devices within said network, querying a user of said first data processing device to determine whether said user desires to wait for availability of said load device;

said first data processing device aborting loading of said required system data if said user does not desire to wait for availability of said load device;

said first data processing device waiting for said load device to become available when said user desires to wait for availability of said load device;

loading said required system data into said system software resource from said load device via said network when said load device is available to said system software resource;

said first data processing device accessing said required system data from said system software resource via said network and resuming data processing operations;

whereby said required system data is provided to said first data processing device, and said data processing operations may continue.

2. The method for providing required system data to said first data processing device as set forth in claim 1 wherein said step of loading said required system data into said system software resource further comprises the steps of:

determining whether said load device is owned by another process when said load device is not available to said system software resource;

saving a device state of said load device when said load device is not owned by another process so as to allow removal of media in said load device;

requesting said media be removed from said load device;

aborting loading of said required system data when said removal of said media is not successful; and loading said required system data into said system software resource from said load device when said removal of said media is successful.

3. The method for providing required system data to said first data processing device as set forth in claim 2 wherein said step of loading said required system data into said system software resource further comprises the steps of:

requesting restore of said media removed when said loading of said required system data is successful; and restoring said device state when said media removed is successfully restored in said load device.

4. The method for providing required system data to said first data processing device as set forth in claim 3 wherein said index data record includes the following fields:

| Field # | Element Name | Element description |
| --- | --- | --- |
| 1 | key | direct access random key technique |
| 2 | filepath | full file pathname |
| 3 | filename | file being searched |
| 4 | clustername | name of the software "cluster" |
| 5 | required clusters | related software "clusters" which will also have to be loaded in order to assure that the newly loaded software will function |
| 6 | software load size | amount of space required by the software if it were loaded |
| 7 | software location | location on either the media or the network. |

* * * * *

UNITED STATES PATENT AND TRADEMARK OFFICE
CERTIFICATE OF CORRECTION

PATENT NO. : 5,226,176
DATED : 7/6/93
INVENTOR(S) : Westaway et al.

It is certified that error appears in the above-identified patent and that said Letters Patent is hereby corrected as shown below:

ON THE TITLE PAGE:

Item [54], delete "SYSTEM FOR SELECTIVELY ABORTING OPERATION OR WAITING TO LOAD REQUIRED DATA BASED UPON USER RESPONSE TO NON-AVAZLABILITY OF NETWORK LOAD DEVICE" and insert --SYSTEM FOR SELECTIVELY ABORTING OPERATION OR WAITING TO LOAD REQUIRED DATA BASED UPON USER RESPONSE TO NON-AVAILABILITY OF NETWORK LOAD DEVICE--

Signed and Sealed this

Eighth Day of March, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,226,176
DATED : July 6, 1993
INVENTOR(S) : William D. Westaway, et al.

It is certified that error appears in the above-indentified patent and that said Letters Patent is hereby corrected as shown below:

On the title page, item [73]:

delete "Microsystems, Inc., Mountain View, Calif." and insert --Sun Microsystems, Inc., Mountain View, Calif--

Signed and Sealed this

Twentieth Day of September, 1994

Attest:

BRUCE LEHMAN

*Attesting Officer*      *Commissioner of Patents and Trademarks*